United States Patent [19]

Hess et al.

[11] Patent Number: 5,334,692

[45] Date of Patent: Aug. 2, 1994

[54] HIGHLY BRANCHED POLYPHOSPHONATES BASED ON MELAMINE

[75] Inventors: Bernhard Hess, Moers; Wolfgang Schulz-Schlitte, Dormagen; Jürgen Kirsch, Leverkusen; Dieter Freitag, Krefeld; Uwe Arndt, Cologne; Hans-Georg Gehrke, Odenthal-Eberich; Klaus Zander, Essen, all of Fed. Rep. of Germany

[73] Assignee: Bayer Aktiengesellschaft, Leverkusen, Fed. Rep. of Germany

[21] Appl. No.: 158,160

[22] Filed: Nov. 24, 1993

Related U.S. Application Data

[63] Continuation of Ser. No. 750,063, Aug. 26, 1991, abandoned.

[30] Foreign Application Priority Data

Sep. 6, 1990 [DE] Fed. Rep. of Germany ....... 4028268
Apr. 23, 1991 [DE] Fed. Rep. of Germany ....... 4113157

[51] Int. Cl.$^5$ ............. C08G 79/04; C08L 85/02; C09K 21/14
[52] U.S. Cl. ................................. 528/126; 528/127; 528/128; 528/129; 528/137; 528/139; 528/144; 528/153; 528/158; 528/167; 528/168
[58] Field of Search ........... 528/129, 137, 139, 140, 528/141, 142, 144, 154, 158, 167, 164, 168, 125, 126, 127, 128

[56] References Cited

U.S. PATENT DOCUMENTS

| 3,829,405 | 8/1974 | Cohen et al. ............... 525/125 |
| 3,998,789 | 12/1976 | Yoshioka .................... 524/125 |
| 4,085,283 | 4/1978 | Den Otter et al. ......... 544/214 |
| 4,278,591 | 7/1981 | Granzow ..................... 525/437 |
| 4,332,921 | 6/1982 | Schmidt et al. ............ 525/462 |

FOREIGN PATENT DOCUMENTS

| 0074090 | 3/1983 | European Pat. Off. . |
| 0324356 | 7/1989 | European Pat. Off. . |
| 2307813 | 11/1976 | France . |
| 1336052 | 11/1973 | United Kingdom . |

OTHER PUBLICATIONS

Schmidt et al., Die Angewandte Makrokromolekularie Chemie 132:1-18 (1985).

*Primary Examiner*—John Kight, III
*Assistant Examiner*—Jeffrey Culpeper Mullis
*Attorney, Agent, or Firm*—Connolly & Hutz

[57] ABSTRACT

New, highly branched polyphosphonates which have a greatly improved flame retardant action compared with known polyphosphonates which are suitable as additives for plastics. In addition the new polyphosphonates may be incorporated in plastics as stabilizers with excellent migration properties.

5 Claims, No Drawings

HIGHLY BRANCHED POLYPHOSPHONATES BASED ON MELAMINE

This application is a continuation of application Ser. No. 07/750,063 filed on Aug. 26, 1991, now abandoned.

This invention relates to new highly branched polyphosphonates, to a process for their preparation and to their use for the production of shaped articles, fibres or films and as flame-retardants and stabilizers in plastics.

Polyphosphonates are known (see DE 2 132 350, U.S. Pat. Nos. 3,830,771 and 3,829,405,JP 47/39154, 48/01600, 50/062245, 50/034649, 51/11869 and DE 3 002 550). The polyphosphonates described in these publications have a linear structure and are used inter alia to improve the flame-resistance of plastics.

EP 0 028 345 describes not only linear aromatic polyphosphonates but also branched polyphosphonates and mentions branched triarylphosphates in addition to trihydric and tetrahydric aromatic alcohols in quantities of up to 3 mol-%. The polyphosphonates described should be soluble in methylene chloride and similar solvents, i.e. they are only slightly branched (Column 8, lines 22 et seq). PET moulding compounds containing the above mentioned polyphosphonates and flame protective additives are mentioned in EP 0 324 356. The polyphosphonates described have the disadvantage that, for example, the thermal age resistance is insufficient and when these polyphosphonates are used as flame-retardant additives in combination with other thermoplasts they are required to be used in such a high proportion for obtaining a given flame resistance that the mechanical and thermal properties of the flame-protected mixtures are no longer sufficient for practical use.

The functionality of the polyols mentioned as branching agents in EP 0 028 345 and 0 324 356 is limited to a maximum of 4 and the quantity of these polyols is limited to a total of 3 mol-% since according to the present teaching a larger quantity or higher functionality of these polyols would result in a gelled, insoluble material which is no longer fluid. The present invention overcomes this prejudice and demonstrates that in spite of the high gel content due to the larger quantities of branching agents and/or higher functionality, the polyphosphonates obtained are still fluid and when added in relatively small-quantities to other thermoplasts they develop a powerful flame protective action without significantly impairing the mechanical properties of the whole mixture.

It is surprisingly found that the incorporation of the polyphosphonates according to the invention in other thermoplasts gives rise to no difficulties in spite of their high gel content.

The present invention thus relates to new, highly branched polyphosphonates based on A) from 60 to 99.9% by weight, preferably from 70 to 99.5% by weight, of structural units corresponding to formula (AI) or (AI'),

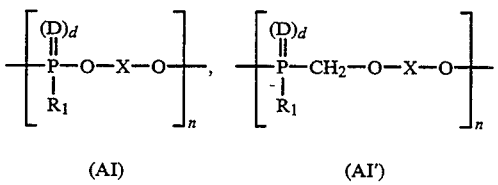

wherein $R_1$ denotes an optionally substituted $C_1$–$C_{10}$, preferably a $C_1$–$C_6$-alkyl group or an optionally substituted aromatic ring with 6 to 12 carbon atoms, D stands for sulphur or oxygen, preferably oxygen, d stands for zero or 1, preferably 1, n stands for integers from 2 to 1000, preferably from 2 to 100, and X stands for the formula

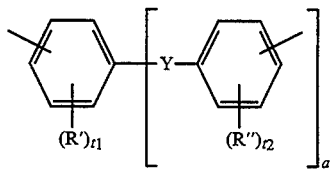

wherein

Y denotes a single bond or a $C_1$–$C_3$-alkylene or $C_5$–$C_{12}$-cycloalkylene group or O, S, CO or $SO_2$, preferably $C_1$–$C_3$-alkylene, R' and R" denote, independently of one another, $C_1$–$C_{10}$-alkyl, preferably $C_1$–$C_6$-alkyl, halogen, phenyl or hydrogen, most preferably hydrogen, a stands for zero or 1, preferably 1, and $t_1$ and $t_2$ denote, independently, 0, 1, 2, 3 or 4, preferably 0, or X denotes a naphthylene or phenolphthalein group, and B) from 0.1 to 40% by weight, preferably from 0.5 to 30% by weight, of structural units of one or more compounds corresponding to formulae (BII) or (BIII)

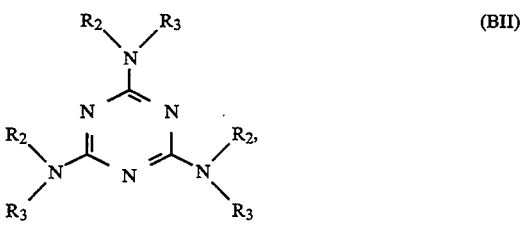

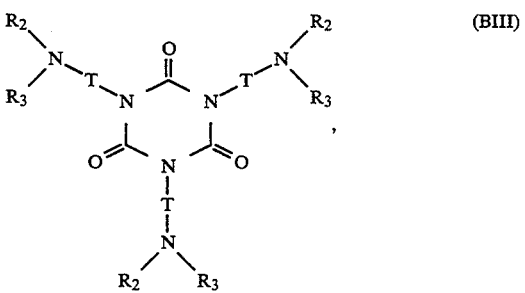

wherein

R₂ stands for a —CH₂—O— structural unit or hydrogen,

R₃ stands for a CH₂—O structural unit and

T stands for an optionally substituted $C_1$-$C_{10}$-alkylene, $C_5$-$C_{10}$-cycloalkylene or $C_6$-$C_{10}$-arylene group or an optionally substituted diphenylmethane group, and/or structural units based on polyphenols having at least 3 aromatic OH groups.

Polyphenols having at least 3 aromatic OH groups are obtained, for example, from the industrial condensation of phenol with formaldehyde or acetone or the hydroxylation of aromatic compounds. The following are examples of suitable polyphenols:

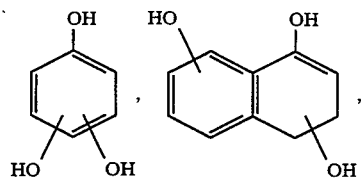

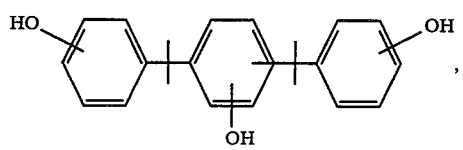

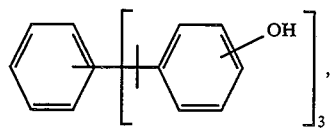

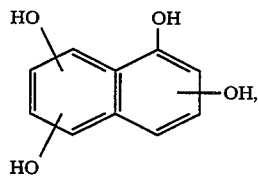

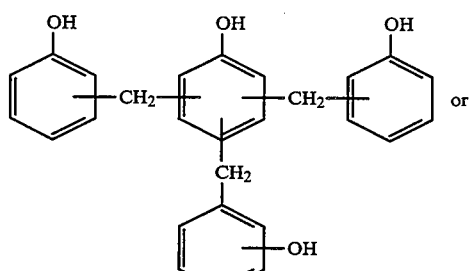 or

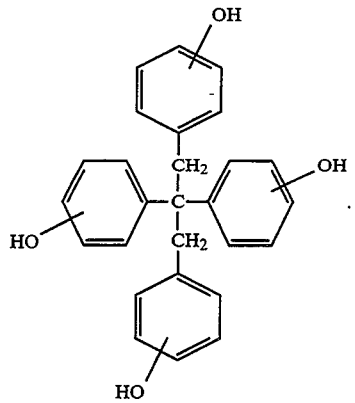

Preferred groups R₁ of formulae (AI) and (AII) include the methyl and ethyl group and the phenyl group, the methyl group being particularly preferred.

X preferably stands for an optionally substituted phenylene, bisphenylene, $C_1$-$C_3$-alkylbisphenylene, $C_5$-$C_{12}$-cycloalkylbisphenylene, sulphonyl bisphenylene, oxobisphenylene, thiobisphenylene, phenol phthalein, carbonyl bisphenylene or naphthylene group, in particular phenylene or $C_1$-$C_3$-alkylbisphenylene. In this connection it should be noted that the hydroxyl compounds on which the bivalent groups X are based can be used in any mixtures with one another for the synthesis of the structural units of the type corresponding to formula (A). In that case, the distribution of the units (X) is random.

Highly branched polyphosphonates based on structural units derived from (AI) are preferred, such as the following:

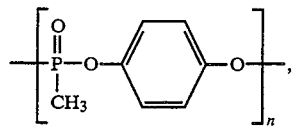

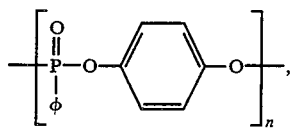

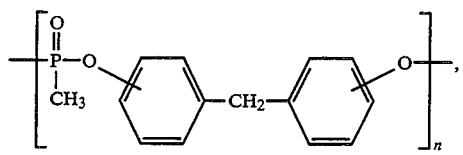

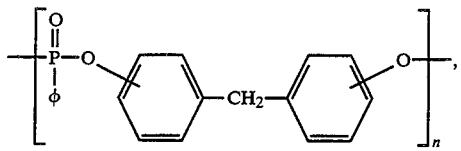

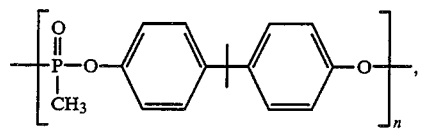

-continued

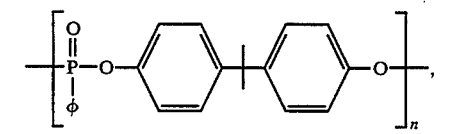

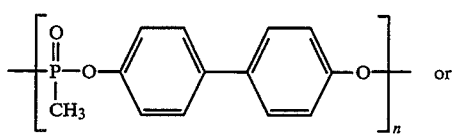

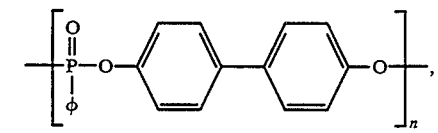

wherein
φ stands for phenyl and
n has the meaning indicated for formula (AI) and B) structural units derived from (BII) and (BIII), such as those corresponding to the following formulae:

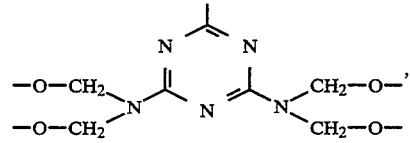

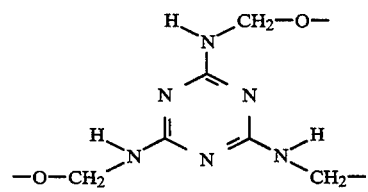

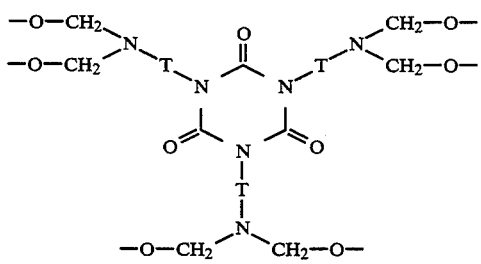

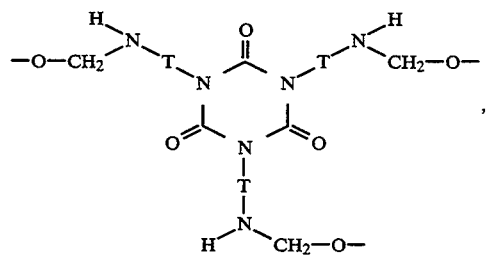

where T stands for

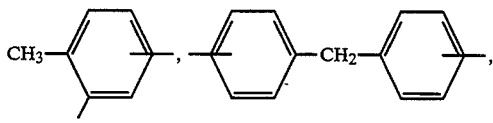

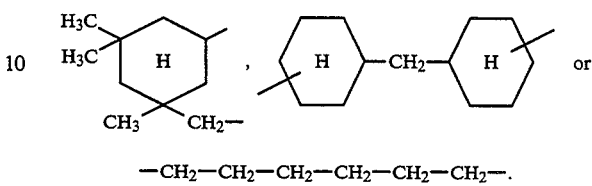

Highly branched polyphosphonates based on structural units of formulae (AI) are particularly preferred, such as the following:

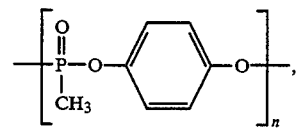

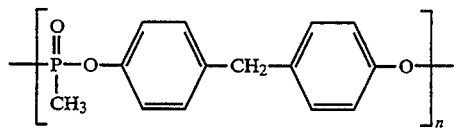

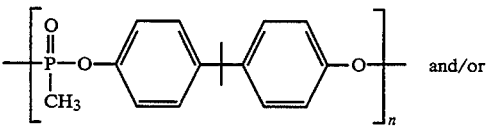
and/or

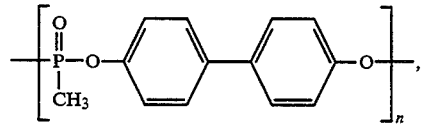

wherein
n has the meaning indicated for formula (AI) and B) structural units corrresponding to the following formula

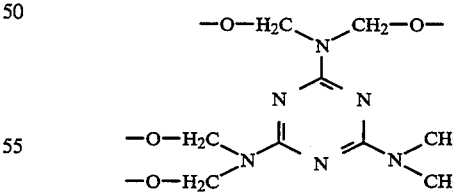

Components on which this structural unit is based and which can readily be incorporated by condensation are hexa-alkyl ethers of methylolated melamine of the kind obtainable from many firms as trade products, such as hexymethyl ether known as Cymel® 300, 301 and 303 obtainable from cyanamide and corresponding products of Hoechst (maprenals).

The polyphosphonates on which the structural units (AI) and (AII) (Component A) are based have been described e.g. in DE 3 833 694, DE 3 002 550, JA 47-39154, JA 48-01600, JA 50-062245, JA 50-034649, JA 51-111869 and EP 0 334 423.

The structural units of the type corresponding to formulae A) and B) are contained in the polyphosphonate in the proportions mentioned above. The structural units of the type corresponding to formula B) may be present as mixtures with one another in the highly branched polyphosphonates, the most suitable proportions in which these units are mixed being easily determined by preliminary tests and depending inter alia on the purpose for which the products are to be used.

The invention further relates to a process for the preparation of the highly branched polyphosphonates by the trans-esterification of at least one phosphonic acid ester and a polyfunctional compound which form the basis of the above-mentioned structural units of formula type B) and are known as branching agents, with an aromatic dihydroxy compound in the solvent-free state in a stream of nitrogen at atmospheric pressure or reduced pressure in the presence of catalytic quantities of a trans-esterification catalyst with removal of the volatile constituents by distillation.

The trans-esterification catalysts used may be sodium alcoholates such as sodium phenolate or sodium methanolate or at least one selected from $C_1$-$C_{18}$-tetraalkyltitanates, $C_3$-$C_{18}$-tetraalkylzirconates, $C_2$-$C_{18}$-trialkylvanadylates, $C_2$-$C_4$-dialkyl tin oxides, $C_2$-$C_4$-dialkyl-$C_2$-$C_4$-dialkyl tin compounds and zinc and calcium salts, in particular their acetates, one selected from antimony or bismuth salts, one selected from $C_2$-$C_4$-dialkyl stannic acid esters, one selected from $C_2$-$C_4$-trialkyl stannic acid esters or at least one of the catalysts from the above-mentioned groups in admixture with germanium dioxide or titanium dioxide or acids such as phosphoric or phosphonic acids.

The new highly branched polyphosphonates may in principle be prepared as described in EP 00 28 345.

The aromatic dihydroxy compounds used may be those corresponding to the following general formula

HO—X—OH in which
X has the meaning indicated for formula (AI) and (AI').

Aromatic dihydroxy compounds of this type are described, for example, in U.S. Pat. Nos. 3,028,365, 2,999,835, 3,148,172, 3,275,601, 2,991,273, 3,271,367, 3,062,781, 2,970,131 and 2,999,846, in German Offenlegungsschriften Nos. 1 570 703, 2 063 050, 2 063 052 and 2 211 095, in French Patent Specification 1 561 518 and in the monograph: "H. Schnell, Chemistry and Physics of Polycarbonates, Interscience Publishers, New York 1964".

The following are examples:
Hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α'-bis-(hydroxyphenyl)-diisopropylbenzenes
and derivatives thereof which are alkylated or halogenated in the nucleus.

The following are preferred aromatic dihydroxy compounds:
4,4'-Dihydroxy-di-(4-hydroxyphenyl)-propane, bis-(hydroxyphenyl)-methane, hydroquinone and bis-(4-hydroxyphenyl)sulphone. Hydroquinone, 2,2-bis-(4-hydroxyphenyl)-propane and bis-(hydroxyphenyl)-methane are particularly preferred.

The phosphonic acid esters used may be compounds corresponding to the following formulae:

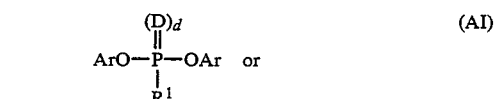  (AI)

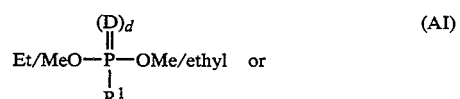  (AI)

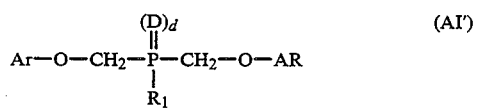  (AI')

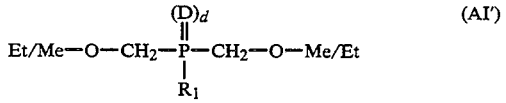  (AI')

in which
$R^1$, D and d have the meanings indicated for formula (I),
Ar stands for an aryl group, preferably phenyl, and Et stands for ethyl and Me for methyl.

The phosphonic acid esters used may in particular be compounds corresponding to the following formulae:

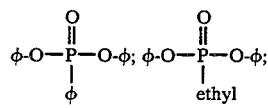

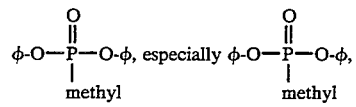

wherein φ stands for phenyl.

The polyphosphonates according to the invention have an insoluble component in methylene chloride of ≧25% by weight, preferably ≧30% by weight, more preferably ≧60% by weight and most preferably ≧80% by weight. The insoluble portion in the polyphosphonates is determined by the proportion of polyphosphonates which can only be gelled (method given in the Examples which follow) and is a measure of the degree of branching.

The highly branched polyphosphonates according to the invention may be used as additives in plastics (thermoplasts and duromers), in which they produce a greatly improved flame-retardant action compared with polyphosphonates. In addition, the polyphosphonates are more readily incorporated in plastics (see Comparison Examples) and the polyphosphonates according to the invention may be incorporated in plastics as stabilizers with excellent migration properties.

The polyphosphonates according to the intention may be added to the plastics in the usual mixing apparatus such as rolling mills, kneaders or single shaft or multishaft extruders, optionally together with known reinforcing agents, processing auxiliaries and colour stabilizers. In this connection it is particularly advantageous to dry both the plastics and the polyphosphonates thoroughly before they are incorporated. The polyphosphonates according to the invention may also be directly added to the plastics as a physical mixture without previous melt compounding, e.g. in conventional injection moulding processes.

Colour stabilizers are:

A) Reductive compounds such as tin(II)compounds, phosphours-containing compounds in which the phosphorus has an oxidation state of <V, and in particular those of the following formulae:

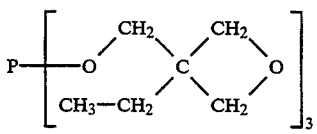

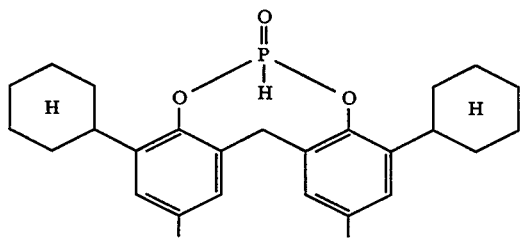

The particularly preferrd compounds is: Irgafos P-EPQ from Ciba-Geigy, of the formula:

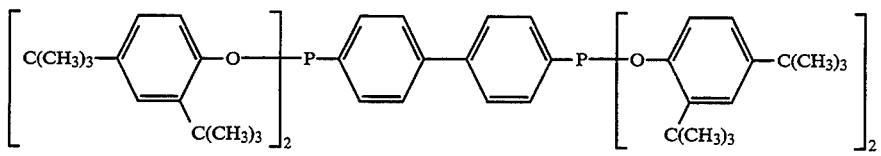

B) Reactive compounds which are capable of reacting with the phenolic end groups of polyphosphonate, such as acid anhydrides, e.g. phthalic acid anhydride, tetrahydrophthalic acid anhydride, trimellitic or pyromellitic acid anhydride, bis-, tri- or polyepoxides, and in particular bisphenol A bisglycidyl ether, triglycidyl isocyanurate, di- or triisocyanates and di- or trimers thereof.

C) Protective coating agents against oxidative attack, such as for example, waxes of the most varied kinds, which can also simultaneously serve as mould-release agents, such as bisisooctyl sebacate and pentaerythritol tetrastearate.

The colour stabilizers can be employed in quantities of 0,1 to 10% by weight, based on the thermoplastic moulding composition. They are most advantageously added during the mixing of the polyphosphonates with the plastics.

Mixing of the polyphosphonates according to the invention with plastics is carried out in known manner (see DE 3 733 840/German Patent Application P 3 833 694.4/DE 3 342 414).

The highly branched polyphosphonates according to the invention may also be used directly for the production of thermoplastic articles, films or fibres.

In the combination of the polyphonates according to the invention with crystallizing thermoplasts such as, for example, polyethylene terephthalate or polybutylene terephthalate it may be advantageous to add nucleating agents for the crystallization of thermoplasts to the polyphosphates, e.g. talc, microtalc or finely divided barium sulphate, or even to carry out the condensation of the polyphosphonate in the presence of the nucleating agent in order to accelerate the crystallisation of the thermoplasts.

The polyphosphonates are particularly preferably used in combination with polyalkylene terephthalates. The invention furthermore relates to thermoplastic moulding compositions consisting of 30 to 98% by weight, preferably 40 to 80% by weight, and in particular 45 to 75% by weight of polyalkylene terephthalate, and preferably polyethylene or polybutylene terephthalate or mixtures thereof, and 2 to 30% by weight, preferably 2 to 25% by weight, of highly branched polyphosphonates according to the invention and, optionally, customary additives.

The following may be employed as additives in each case based on the total quantity of polyalkylene terephthalate and polyphosphonate, 0.1 to 10% by weight, of colour stabilizers, 0 to 45% by weight of glass fibres, 0 to 10% by weight of polytetrafluoroalkylene, such as polytetrafluoroethylene, 0.1 to 10% by weight of nucleating agents such as talc or BaSO₄ and 0.1 to 10% by weight of mould release agents and protective coating agents.

EXAMPLES

Components used and their abbreviations

BPF-H: Bisphenol F (dihydroxydiphenylmethane) commercial mixture of 14.4% by weight of 2,2'-BPF, 44.2% by weight of 2,4'-BPF, 31.8% by weight of 4,4'-BPF, 9.6% by weight of polyphenols BPF-R: pure 4,4'-bisphenol F BPF-B: Bisphenol F commercial mixture of 6.0% by weight of 2,2'-BPF, 36.9% by weight of 2,4'-BPF, 45.0% by weight of 4,4'-BPF 12.1% by weight of polyphenols MPDPE: Methane phosphonic acid diphenyl ester M.p.: 36°–37° C., 98% pure Cymel: Cymel 301: trade product of Cyanamid; Commercial hexamethoxy methyl melamine ZnAc: Zinc acetate dihydrate I. Synthesis of some highly branched polyphosphonates:

BPF-H polyphosphonate (name: POP 1)

|        | Mol  | Parts by weight |
|--------|------|-----------------|
| BPF-H  | 1.00 | 200.0           |
| MPDPE  | 0.95 | 235.6           |
| CYMEL  | 0.02 | 7.8             |
| ZnAc   |      | 0.02            |

The components shown in the Table or a suitable multiple thereof are weighed into a stirrer apparatus with a short path column and heated to 240° C. after repeated evacuation and gassing with nitrogen. After the components have been melted at 120° C., the stirrer is switched on. The internal pressure is lowered to 500 mbar after 30 minutes at 240° C., and phenol then begins to split off. The temperature is raised to 280° C. at an internal pressure of 500 mbar and when this temperature is reached the internal pressure is lowered to 10–20 mbar. Esterification is carried out under these conditions until the melt has been converted into a gel which creeps up the stirrer shaft. The reaction mixture is then gassed with nitrogen and the melt is left to settle and is then either spun off and granulated or broken and chopped up when cold. Gel content: 54%

Determination of Gel Content

The degree of branching of the polyphosphonates is determined by determining the gel content. For this purpose, 1.0 g of ground polyphosphonate (particle size below 1 mm) is introduced into 50 ml of freshly distilled, alcohol-free dichloromethane. After 5 minutes' exposure to ultrasound in an ultrasound bath (bath temperature 21°–28° C.) (Bransonic B-2200 E4, HF nominal power: 60 Watt) at room temperature, the reaction mixture is filtered and the dissolved portion of phosphonate is determined after removal of the solvent by distillation.

BPF-B Polyphosphonate (Name: POP 2)

|        | Mol  | Parts by weight |
|--------|------|-----------------|
| BPF-B  | 1.00 | 200.0           |
| MPDPE  | 1.00 | 248.0           |
| CYMEL  | 0.01 | 3.9             |
| ZnAc   |      | 0.02            |

This product is prepared as described for POP 1 except that the polycondensation temperature is raised to 300° C. instead of 280° C. Gel content: 72%

BPF-R polyphosphonate (name: POP 3) Comparison experiment without branching agent

|        | Mol  | Parts by weight |
|--------|------|-----------------|
| BPF-R  | 1.00 | 200.0           |
| MPDPE  | 1.00 | 248.0           |
| ZnAc   |      | 0.02            |

The method of preparation is the same as that described for POP 1, carried out at a maximum polycondensation temperature of 300° C. and a vacuum of 1 mbar.

The melt did not gel and no gel components could be found.

BPF-B polyphosphonate (name: POP 4) with polyphenol as the only branching agent

|        | Mol  | Parts by weight |
|--------|------|-----------------|
| BPF-B  | 1.00 | 200.0           |
| MPDPE  | 1.00 | 248.0           |
| ZnAc   |      | 0.02            |

The method of preparation is the same as that described for POP 1 except that the polycondensation temperature is raised to 300° C. and the vacuum to 0.01 mbar.

The melt gelled in the final phase of polycondensation. Gel content: 42%

BPF-H polyphosphonate (name: POP 5)

|        | Mol  | Parts by weight |
|--------|------|-----------------|
| BPF-H  | 1.00 | 200.0           |
| MPDPE  | 0.95 | 235.6           |
| CYMEL  | 0.05 | 19.5            |
| ZnAc   |      | 0.02            |

The method of preparation is the same as that described for POP 1 except that the polycondensation temperature is raised to a maximum of 240° C. and the vacuum to 5 mbar.

The melt gelled in the final phase of polycondensation. Gel content: 64%

BPF-H polyphosphonate (name: POP 6) with nucleating agent

|        | Mol  | Parts by weight |
|--------|------|-----------------|
| BPF-H  | 1.00 | 200.0           |
| MPDPE  | 0.95 | 235.6           |
| CYMEL  | 0.02 | 7.8             |
| ZnAc   |      | 0.02            |
| BaSO4  |      | 104.4           |

The method of preparation is the same as that described for POP 1 except that the vacuum is raised to 5 mbar in the final phase of polycondensation. Gel content: 65%

II. Preparation and properties of compounds containing polyphosphonates POP 1 to POP 6

All the thermoplastic polymers are put into the process as granulates or powders. The components shown in Table I are mixed in a double shaft extruder, melted, extruded to form strands and granulated. Preparation of the moulding compounds may be carried out, for example, with a Werner and Pfleiderer extruder ZSK 32 at the usual operating temperatures and at a speed of rotation of the screws of 80 to 130 revs/min and a throughput of 8 to 14 kg/h.

After sufficient drying (e.g. 3 to 4 hours at 140° C.), the granulate is extruded in conventional injection moulding machines at mass temperatures of 230° to 300° C., a mould temperature of 20° to 140° C. and a dwell time of the melt of not longer than 9 minutes for the production of moulded articles or standard test rods.

The flame-resistance is tested along the guidelines of Underwriter Laboratories (UL-94 Test). The results are summarized in Table I. The quantities of components used are given in parts by weight.

TABLE I

| Example No. | 1 | 2 | 3 Comp. | 4 | 5 | 6 | 7 |
|---|---|---|---|---|---|---|---|
| PET[1] | 53.6 | 53.6 | 53.6 | 53.6 | 53.6 | 51.6 | 53.1 |
| POP 1 | 12.5 | | | | | | 12.5 |
| POP 2 | | 12.5 | | | | | |
| POP 3 Comp. | | | 12.5 | | | | |
| POP 4 | | | | 12.5 | | | |
| POP 5 | | | | | 12.5 | | |
| POP 6 | | | | | | 17.5 | |
| Glass fibres[2] | 30.0 | 30.0 | 30.0 | 30.0 | 30.0 | 30.0 | 30.0 |
| PTFE[3] | 0.5 | 0.5 | 0.5 | 0.5 | 0.5 | 0.5 | 0.5 |
| Wax[4] | 0.4 | 0.4 | 0.4 | 0.4 | 0.4 | 0.4 | 0.4 |
| BaSO$_4$[5] | 3.0 | 3.0 | 3.0 | 3.0 | 3.0 | — | 3.0 |
| Irgafos[6] | | | | | | | 0.5 |
| UL-94 Test: (1.6 mm) 2d/7d | V0 | V0 | failed | V1 | V0 | V0 | V0 |

[1]Polyethylene terephthalate, relative viscosity at 25° C.: 1.4 in phenol/o-dichlorobenzene (1:1)
[2]OCF429YZ Fibre length: 5 mm
[3]Polytetrafluoroethylene: Hostaflon TF 2027 (Hoechst)
[4]E-Wachs of Hoechst: Montanic acid ester
[5]BaSO$_4$ of Sachtleben corresponding to OS 3 810 423.
[6]Irgafos P-EPQ, Ciba-Geigy inc. (formula see page 14:)

Production of Moulded Articles From Mixed Granulate

The components of Example 1 shown in Table I are extruded and granulated as described, with the exception of POP 1, and the granulate obtained is mixed with POP 1 granulate in the proportions of the formulation given in Example 1. The mixture is referred to as Example 1a. The mixed granulate is dried at 50 mbar and 60° C. for 12 hours and then extruded to form standard test rods. The mechanical properties of the standard test rods obtained from the mixed granulate are compared with those of the compound from Example 2 shown in Table III.

| Example | 1 Compound | 1a Mixed granulate |
|---|---|---|
| Vicat [°C.] | 185 | 230 |
| Impact strength [KJ/m$^2$] (JZOD 1C) | 15 | 24 |
| UL 94 Test (1.6 mm) | V0 | V0 |

The Examples clearly show that flame-resistant thermoplasts with good technological properties can only be obtained with the highly branched polyphosphonates according to the invention.

We claim:

1. Highly branched compounds composed of phosphorus-containing structural units and melamine units, comprising:

A) from 70 to 99.5% by weight of structural units corresponding to formula (AI) or (AI')

$$\left[ \begin{array}{c} (D)_d \\ \| \\ -P-O-X-O- \\ | \\ R_1 \end{array} \right]_n , \quad \left[ \begin{array}{c} (D)_d \\ \| \\ -P-CH_2-O-X-O- \\ | \\ R_1 \end{array} \right]_n$$

(AI)          (AI')

wherein $R_1$ stands for a $C_1$-$C_{10}$ alkyl group or an aromatic ring having 6 to 12 carbon atoms, D stands for oxygen,
d denotes 1,
n stands for integers from 2 to 1000 and
X stands for the following formula $$\left[ (R')_{t_1} \underset{\phantom{x}}{\bigcirc} -Y- \underset{\phantom{x}}{\bigcirc} (R'')_{t_2} \right]_a$$

wherein

Y denotes a single bond or $C_1$-$C_3$-alkylene, $C_5$-$C_{12}$-cycloalkylene, O, S, CO or SO$_2$,
R' and R" denote, independently, $C_1$-$C_{10}$-alkyl, halogen, phenyl or hydrogen,
a stands for zero or 1, and
$t_1$ and $t_2$ denote, independently, 0, 1, 2, 3 or 4, or
X denotes a naphthylene or phenolphthalein group, and B) from 0.5 to 30% by weight of structural units of one or more compounds corresponding to formula (BII) or (BIII)

$$\begin{array}{c} R_2 \quad R_3 \\ \diagdown N \diagup \\ | \\ N \\ R_2 \diagdown N \diagup \diagdown N \diagup R_2 \\ | \quad \quad | \\ R_3 \quad \quad \quad R_3 \end{array} \quad (BII)$$

$$\begin{array}{c} R_2 \diagdown N-T \diagdown \underset{\|}{\overset{O}{C}} \diagup T-N \diagup R_2 \\ R_3 \diagup \quad N \quad \quad N \quad \diagdown R_3 \\ O=\underset{}{C} \quad \quad \underset{}{C}=O \\ \diagdown N \diagup \\ | \\ T \\ | \\ N \\ R_2 \diagup \diagdown R_3 \end{array} \quad (BIII)$$

wherein $R_2$ stands for a CH$_2$—O structural unit or hydrogen
$R_3$ stands for a CH$_2$—O structural unit and
T stands for an optionally substituted $C_1$-$C_{10}$-alkylene, $C_5$-$C_{10}$-cycloalkylene or $C_6$-$C_{10}$-arylene group or an optionally substituted diphenylmethane group, together with structural units derived from polyphenols having 3 or 4 aromatic OH groups.

2. Plastics containing the highly branched compounds of claim 1 and a color stabilizer.

3. A synthetic resin containing the highly branched compounds of claim 1.

4. A process for the preparation of the highly branched compounds as claimed in claim 1, wherein a phosphonic acid ester is transesterified with an aromatic dihydroxy compound and a compound on which the structural units of the formula B) in claim 1 are based, in the solvent-free state under nitrogen at atmospheric pressure or reduced pressure in the presence of a catalytic quantity of transesterification catalyst with removal of the volatile constituents by distillation.

5. A thermoplastic molding composition comprising:

i) 30 to 98% by weight of polyalkylene terephthalate; and ii) 2 to 30% by weight of highly branched compounds composed of phosphorus-containing structural units and melamine units, comprising:

A) from 70 to 99.5% by weight of structural units corresponding to formula (AI) or (AI')

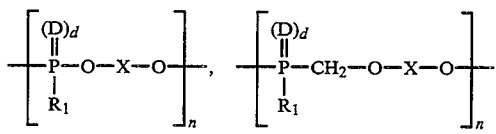

(AI)    (AI')

wherein $R_1$ stands for a $C_1-C_{10}$ alkyl group or an aromatic ring having 6 to 12 carbon atoms, D stands for oxygen, d denotes 1, n stands for integers from 2 to 1000 and X stands for the following formula

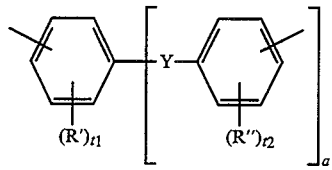

wherein

Y denotes a single bond or $C_1-C_3$-alkylene, $C_5-C_{12}$-cycloalkylene, O, S, CO or $SO_2$, R' and R" denote, independently, $C_1-C_{10}$-alkyl, halogen, phenyl or hydrogen, a stands for zero or 1, and $t_1$ and $t_2$ denote, independently, 0, 1, 2, 3, or 4 or X denotes a naphthylene or phenolphthalein group, and B) from 0.1 to 40% by weight of structural units of one or more compounds corresponding to formula (BII) or (BIII)

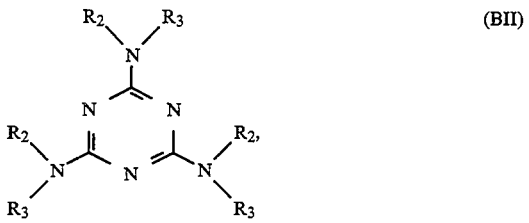

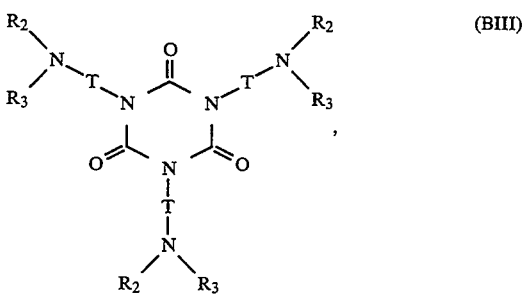

wherein $R_2$ stands for a $CH_2-O$ structural unit or hydrogen $R_3$ stands for a $CH_2-O$ structural unit and T stands for an optionally substituted $C_1-C_{10}$-alkylene, $C_5-C_{10}$-cycloalkylene or $C_6-C_{10}$-arylene group or an optionally substituted diphenylmethane group, together with structural units derived from polyphenols having 3 or 4 aromatic OH groups.

* * * * *